United States Patent [19]

Farr et al.

[11] 4,055,080

[45] Oct. 25, 1977

[54] TORQUING APPARATUS

[76] Inventors: Emory W. Farr, 649 Jalapa Drive, Covina, Calif. 91724; Robert D. Greene, 267 Renoak Way, Arcadia, Calif. 91006

[21] Appl. No.: 522,599

[22] Filed: Nov. 11, 1974

[51] Int. Cl.² ............................................. B25B 23/14
[52] U.S. Cl. .................................... 73/139; 73/136 R
[58] Field of Search .................. 73/139, 136 R; 81/57

[56] References Cited

U.S. PATENT DOCUMENTS

| | | | |
|---|---|---|---|
| 2,724,266 | 11/1955 | Baker et al. | 73/136 R |
| 3,858,444 | 1/1975 | Wallace | 73/139 |

*Primary Examiner*—Charles A. Ruehl
*Attorney, Agent, or Firm*—J. C. Baisch

[57] ABSTRACT

The present invention relates to an improved torquing apparatus that may be retrofitted in an in-line relationship, onto an existent power wrench as normally employed in mass production assembly processes. The disclosed apparatus is adapted to fit between the head of the wrench motor and the wrench attachment, so that the original torquing speed and power are transmitted to the work-piece in the same manner as originally intended. The disclosed torquing apparatus is designed to practically immune extraneous forces; so that the disclosed apparatus is particularly well adapted for wrenches employed in hand-held applications.

6 Claims, 3 Drawing Figures

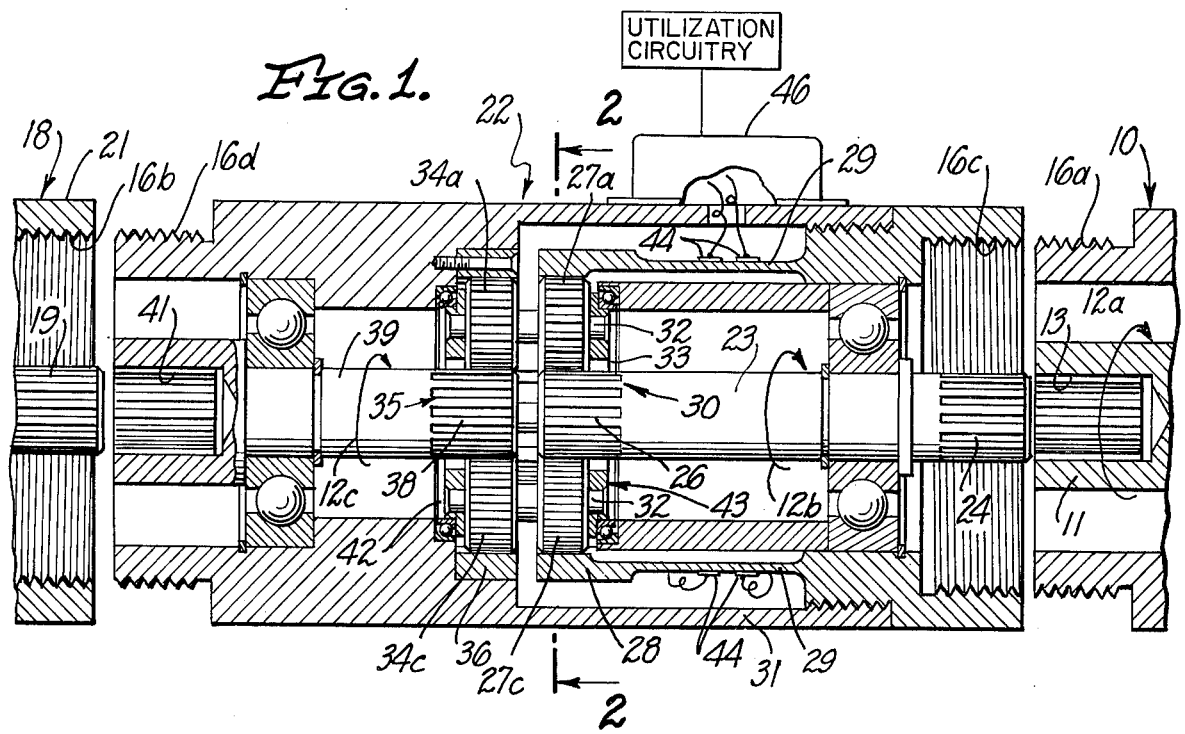
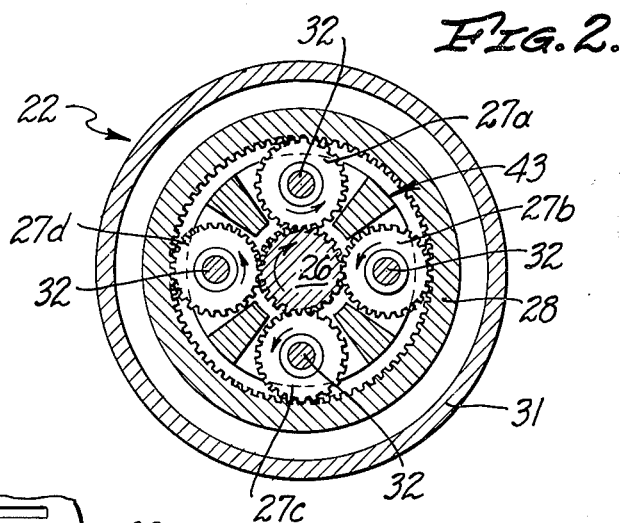
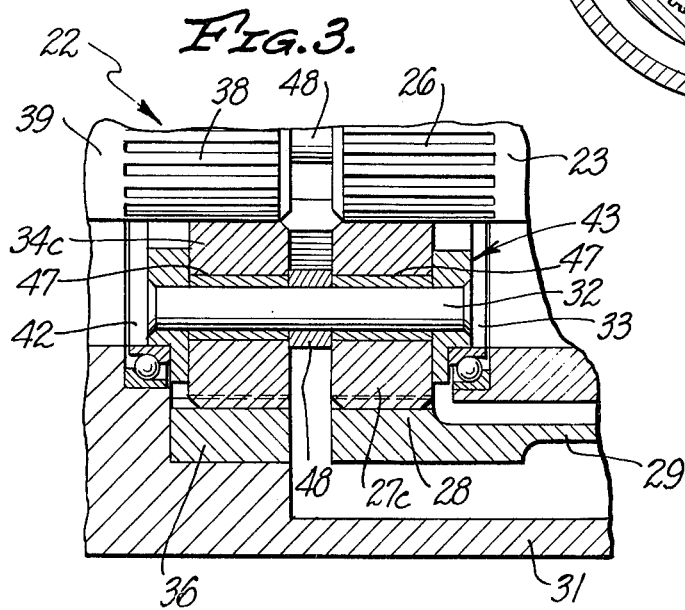

TORQUING APPARATUS

BACKGROUND

It is well known that progressively more apparatuses are being assembled by means of threaded assemblies such as bolts, nuts, etc.; and that in assemblying larger devices, such as automobiles and the like, the amount of tightening these threaded assemblies is often very critical. For example, if a bolt is tightened to too great an extent, the bolt will be stretched; so that its desired strength is not available. On the other hand, if the bolt is not tightened sufficiently, there is a danger of its loosening to the point at which it may actually fall off. In fact, it appears that government specifications and the danger of law suits may cause the recall of many vehicles for readjustment of threaded assemblies.

In the past, the tightening of threaded assemblies was accomplished manually, the amount of tightening being left to the individual operator; but variations in strength, attitude, judgment, etc.— and the need for mass production soon obsoleted this manual procedure. Soon after this, power wrenches were introduced; these comprising motors that were driven electrically, pneumatically, or hydraulically. The wrench motors are suitably geared to provide the desired rotational speed and "torque" (which is a measure of the turning strength of the wrench). Moreover, most of these power wrenches contain some type of clutch that releases automatically when the bolt or nut has been suitably tightened. Unfortunately, the resultant automatic power wrench was not completely satisfactory for several reasons — including variability of the clutch release, inertial rotation after the clutch was released, difficulty of immediate power shut-off, etc. The most common wrench used in present automated assembly processes are hand-held tools employing a right-angle wrenching head.

Thus, an improved automatic power wrench is needed.

OBJECTIVES AND DRAWINGS

It is, therefore, the principal objective of the present invention to provide an improved torquing apparatus.

It is another objective of the present invention to provide an improved torque apparatus that may be connected in-line with a power wrench.

It is still another objective of the present invention to provide an improved torquing apparatus that provides an improved readout of the torque being transmitted.

It is a further objective of the present invention to provide an improved torquing apparatus that is practically immune to operator-induced errors; and is, therefore, well adapted for hand-held operations.

It is still a further objective of the present invention to provide an improved torquing apparatus that may be retrofitted onto existent power wrenches, in lieu of designing power wrenches especially for incorporating these devices.

It is a still further objective of the present invention to provide an improved torquing apparatus that may be adapted to fit the various power wrenches of different manufacturers.

It is a still further objective of the present invention to provide an improved torquing apparatus that has a 1:1 input/output relationship, to avoid effecting the original operating characteristics of the power wrench.

The attainment of these objectives and others will be realized from a study of the following description, taken in conjunction with the drawings of which:

FIG. 1 shows a longitudinal cross-sectional view of the disclosed torquing apparatus.

FIG. 2 shows a transverse cross-sectional view of the present torquing apparatus;

FIG. 3 shows an enlarged partial longitudinal cross-sectional view of a portion of the present torquing apparatus.

SYNOPSIS

Broadly speaking, the present invention comprises an input planetary gear system and an output planetary gear system; both of these being mounted on a common carrier. One of the planetary gear systems coacts with a ring gear that produces twisting of a torque tube; and strain gauges mounted on the torque tube provide the desired torquing signals.

INTRODUCTION

The power wrenches discussed above comprise a wrench motor having an external casing and an internal rotating member (armature), the external end of which is adapted to be coupled to a wrench attachment that makes actual contact with the work piece (nut, bolt, etc.) that is to be tightened. These wrench attachments are therefore available in a large variety of sizes; and are available in straight drives, right-angle drives, etc. The armature-to-attachment coupling is usually a snap-on coupling; but may take other forms, such as a screw-thread coupling or the like.

With the advent of miniaturized electronic circuitry, it became feasible to use electronic measurement and/or control of torquing apparatus; and a number of different torque measuring and control devices were proposed. Most of these torque measuring and control devices, however, suffer from a serious problem; and this problem will be understood from the following discussion.

In order to measure, control, or limit the torque, it is preferable to position the torque measuring element somewhere on the rotating elements; i.e., to form an "in-line" arrangement. However, an in-line arrangement invites the problem of twisted and pulled wires. An alternative in-line arrangement uses "slip rings" to conduct the electrical signal from the in-line torque measuring element to external terminals; but these slip-rings raise their own peculiar problems.

A different approach for electrically measuring the torque is to place a torque measuring element between the motor casing and its mounting. This approach works well only for those applications wherein the power wrench is mounted on a rigid mounting base; having the disadvantage that when the wrench is hand-held, any bending or twisting forces introduced by the operator cause the torque measuring arrangement to introduce spurious signals that ultimately provide erroneous results.

DISCLOSURE

The manner in which the present invention overcomes the prior-art problems will be understood from FIG. 1. Here a power wrench 10 is adapted to be powered by a cable or hose (not shown), so that its armature 11 rotates as indicated by curved arrow 12a; and thus rotates a splined socket 13 integral to the armature 11.

Ordinarily, the head of the power wrench 10 is threadedly coupled, as by a coupling 16a and 16b, to the driven end of a suitable wrench attachment 18; the splined, square, hexagonal, etc. drive 19 of the wrench attachment 18 engaging the complementary splined socket 13 of the armature 11. As indicated above, the coupling 16a/16b may comprise the illustrated threads, a snap-on connection, or some other arrangement.

In the present invention, a torquing unit 22 is between the power wrench 10 and its wrench attachment 18; so that the torquing unit 22 terminates in a complementary threaded coupling portions 16c and 16d.

The torquing unit 22 has, at its input end, an input shaft 23 that terminates in a male splined drive 24 that is adapted to engage the female splined socket 13 of the power wrench 10. Thus, when the power wrench 10 is coupled to the input end of the torquing unit 22, the input shaft 23 is also rotated in the same direction, as indicated by arrow 12b.

The Power Train

The other end of the input shaft 23 terminates in a shaft (sun) gear 26 that is engaged with the innermost teeth of the gears 27a, 27b, 27c etc. of a planetary gear system 30 as additionally indicated in FIG. 2. As further indicated in FIG. 2, the outermost teeth of the planetary gears 27 are engaged with the teeth of an input ring gear 28; and FIG. 1 shows that the input ring gear 28 is part of a tube 29 that has its other end affixed to the housing 31 of the torquing unit 22. FIG. 1 also shows that the above described input planetary gears 27 have their pivot axles 32 affixed to a first base plate 33. The operation of this input planetary system 30 will be explained later. FIG. 1 also shows a second, or output, planetary gear system 35; the output planetary gears 34a, 34b, 34c, etc. also having their outermost tooth portions engaged with the teeth of a fixedly-positioned output ring gear 36, while the innermost tooth portions of the output planetary gears 34 are engaged with the teeth of an output shaft (sun) gear 38. The output shaft 39 terminates in a suitable female splined socket 41 that is adapted to engage the male spline drive 19 of the wrench attachment 18. The operation of this output planetary system 35 will be explained later.

It should also be noted that the output planetary gears 34 are mounted on the same pivot axles 32; and that these axles are also affixed to a second base plate 42, to form a common carrier 43 comprising the two base plates 33 and 42, and their interconnecting pivot axles 32. Alternatively, the carrier may take the form of a solid cylinder that is suitably hollowed to receive the discussed planetary systems.

Thus, there is an input planetary gear system 27 and an output planetary system 34; both of these planetary gear systems being mounted on a common carrier 43, but being otherwise isolated from each other.

Suitable bearings assure that the input and output shafts (23 and 39) and the planetary systems (30 and 35) are properly positioned, are suitably supported in radial and axial directions.

Power Train Operation

The disclosed apparatus operates as follows. Assume that the wrench motor 10 of FIG. 1 is coupled to the torque unit 22, and is suitable powered. It therefore causes the input shaft 23 of FIG. 1, when viewed from motor 10, to rotate in the clockwise direction indicated by the curved arrow 12a. As the input shaft 23 rotates, it causes rotation of the input shaft gear 26. FIG. 2 shows that the clockwise rotation of the input shaft gear 26 causes the gears 27 of the input planetary system 30 to rotate in a counter-clockwise direction; to "react" to the input ring gear 28, and to produce a clock-wise rotation to the carrier 43.

Since carrier 43 represents the input torque to planetary system 35, the clock-wise rotation of carrier 43 reacts to output ring gear 36 to produce a clock-wise rotation to output shaft 39.

It should be noted, that the output shaft 39 thus rotates in the same clock-wise direction as the input shaft 23; and since the input and the output planetary gear systems 30 and 35 are identical, output shaft 39 rotates at the same speed and with the same power as the input shaft 23 (disregarding gear inefficiency). Thus, the power transmission train has an in-line relationship with the wrench motor and the wrench attachment; transmitting the torque as part of the rotating structure—the tube 29 being substantially isolated. It will be further noted that the two planetary gear systems are mirror-images of each other, the output of one planetary system being the input to the other planetary gear system.

Thus, the disclosed torquing unit has a 1:1 input/output drive relationship at essentially identical torque. Because of this 1:1 drive relationship, the disclosed apparatus may be inserted as an in-line drive without introducing any disturbances or changes in the torquing condition; and does not change the characteristics of the selected power wrench.

Torque Measurement

The preceeding discussion has been presented in terms of the assumption that the input and output ring gears 28 and 36, as shown in FIG. 1, are both stationary; but this assumption is not completely true — i.e., only the output ring gear 36 is actually stationary — being part (or affixed to, the housing 31). The input ring gear 28 was previously described as being part of a tube 29 having one end affixed to the housing 31 of the torquing unit 22 while the other end of the tube 29 — with its ring gear 36, is "floating", or "isolated". Thus, under certain conditions, the floating end of tube 29 may be rotated by forces applied to input ring gear 28; so that the tube 29 may be twisted, or torqued. For this reason, tube 29 will be designated as the "torque tube" 29; of the distortion, or twisting of the torque tube is proportional to the instantaneous transmitted torque.

Since the torque tube 29 is of a size and length such that the twisting thereof is relatively small, the wires from the strain gauges 44 are readily connected to electrical terminals that may be enclosed by a suitable stationary protective structure 46, without risk of wire breakage.

The torque induced distortion of the torque tube 29 may, if so desired, be measured by various arrangements — including optics, magnetics, mechanical, electrical, etc.; but the electrical arrangement has the advantages that it is compact, lightweight, simple, impact resistent, and does not require critical alignment.

Under certain conditions, the input ring gear 28 may be the stationary one, and the output ring gear 36 may be isolated — without essentially affecting operations.

FIG. 3 shows an enlarged, partial, longitudinal, cross-sectional view of a portion of the disclosed torquing unit 22; and indicates the input and output shafts 23 and 39, the input and output shaft gears 26 and 38 and two of the input and output planetary gears 27c and 34c. FIG. 3 also shows two of the pivot axles 32, and portions of the input and output base plates 33 and 42 that coact to form the carrier 43 on which the planetary gear systems are mounted.

FIG. 3 also indicates bearings 47 on which the planetary gears may rotate; and also indicates a spacer 48 that functions to space the planetary gears, and to complete the structure of the carrier 43.

Electrical Circuitry

It is well known that when a rod or tube (such as the torque tube 29 of FIG. 1) is twisted, elemental areas on the surface of the rod or tube are stretched in one diagonal direction, and are compressed in a perpendicular diagonal direction. Therefore, a strain gauge 44 may be mounted on the peripheral surface of torque tube 29 in such an orientation that the strain gauge measures this elongation — which is also the measure of the twisting effect on torque tube 29. Similarly, a strain gauge may be mounted to measure the contraction. Thus, the strain gauges produce an electrical torque signal.

Any suitable electrical circuit may be used for enhancing the torque signals. For example, the plurality of strain gauges 44 mounted on the walls of the torque tube 29 may have their output signals connected into a well known Wheatstone Bridge electrical configuration to provide a maximized and optimized readout of the instantaneous torque. Furthermore, as is well known in the art, these bridge circuits may be further sophisticated to compensate for heating of the torque tube. The resultant torque signal may be applied to suitable utilization or computer devices for torque monitoring, printout, torque control, etc.; the torque signal being practically immune to bending forces; and it is therefore particularly well adapted for use as a hand-held tool — since the results of bending, twisting, and pressure forces produced by the operator do not affect the torque reading.

It will now be realized that the disclosed torquing unit may be retrofitted to existent power wrenches without requiring any modification of the power wrench or its wrench attachments, and without obsoleting the existant apparatus. Moreover, by the use of different couplings, the disclosed torquing unit may be retrofitted onto the power wrenches of different manufacturers.

SUMMARY

The disclosed invention has many advantages over prior art arrangements. First of all, it may be retrofitted onto existant power wrenches without any need for modifying the existent wrench. Second, it has particular usage in critical mechanical assembly operations. Third, it is particularly adapted to be used on hand-held power wrenches. Fourth, it provides a 1:1 input/output drive. Fifth, it is practically immune to operator-induced errors. Sixth, it does not change the characteristics of the selected tool. Seventh, it is resistent to rough handling. Eighth, its output may be used for monitor or for torque control. And, finally, the same unit may be adapted, with different couplings, for use with the tools of different manufacturers.

I claim:

1. In combination with a power wrench and a wrench attachment therefor, the improvement comprising:
   an insertable/removable torquing unit adapted to be inserted between said wrench and said attachment;
   means for removably attaching said torquing unit in an in-line relation with said power wrench;
   said torquing unit having a power transmitting train means for transmitting power from said wrench, through said insertable torquing unit, to said attachment;
   said power transmitting train of said insertable torquing unit comprising a gear system having a 1:1 input/output arrangement;
   whereby said power transmitting train may transmit torque from said power wrench to a work piece.

2. The invention of claim 1 wherein
   said power-transmitting train of said insertable torquing unit comprises an input planetary-gear system and a substantially-identical output planetary-gear system;
   a common carrier associated with said planetary-gear systems.

3. The invention of claim 1, wherein said power transmitting train of said insertable torquing unit comprises:
   an input shaft engaged with an input planetary gear system that is engaged with a first input ring gear;
   an output shaft engaged with a substantially identical output planetary gear system that is engaged with a second output ring gear;
   a torque tube having one end rigidly affixed, and having its other end floatingly terminated in one of said ring gears;
   whereby said torque tube may be twisted by the action of the ring gear terminating said torque tube.

4. An insertable/removable torquing unit comprising:
   a power transmitting train having rotatable power transmitting elements therein;
   said rotatable power transmitting elements comprising an input shaft engaged with an input planetary gear system that is engaged with an isolated input ring gear, and further comprising an output shaft engaged with an output planetary gear system that is engaged with a fixed output ring gear;
   a carrier associated with said planetary systems;
   means, comprising a substantially non-rotatable torque tube, for indicating the amount of torque being transmitted by said torquing unit;
   said torque tube having one end affixed to said torquing unit, and having its other end geared to said isolated input ring gear, to be twisted by said isolated input ring gear;
   whereby said torque tube may be twisted by the action of said input planetary gear system and said isolated input ring gear;
   torque indicating means, comprising a plurality of strain gauges mounted on the cylindrical non-rotating wall of said torque tube, for measuring a torque proportional to that transmitted by said torquing unit;
   whereby wires may be used for conducting electrical torque signals from said strain gauges to an external utilization device.

5. The invention of claim 4, including means for releasably coupling said torquing unit in an in-line relation between a power wrench and a wrench attachment;
   whereby said rotatable power transmitting elements of said power transmitting train may transmit torque from said power wrench to a work piece, thus adapting said torquing unit for hand-held use.

6. The invention of claim 5, wherein said power transmitting train comprises a 1:1 input/output arrangement.

* * * * *